United States Patent
Tallarico

(10) Patent No.: US 6,561,000 B2
(45) Date of Patent: May 13, 2003

(54) SAFETY PIN TO BE ACTUATED BY A MAGNETIC KEY

(75) Inventor: Antonio Tallarico, Buenos Aires (AR)

(73) Assignee: AT ING. S.R.L. (AR)

( * ) Notice: Subject to any disclaimer, the term of this patent is extended or adjusted under 35 U.S.C. 154(b) by 0 days.

(21) Appl. No.: 09/845,077

(22) Filed: Apr. 27, 2001

(65) Prior Publication Data

US 2002/0029596 A1 Mar. 14, 2002

(30) Foreign Application Priority Data

Apr. 28, 2000 (AR) .................. P 00 01 02062

(51) Int. Cl.[7] .......... F16B 41/00; E05B 47/00; E05B 19/26
(52) U.S. Cl. ............... 70/231; 70/276; 70/413
(58) Field of Search .............. 70/229, 230, 231, 70/232, 188, 189, 276; 411/910, 402, 403; 81/900, 176.1, 176.15, 176.2, 177.5

(56) References Cited

U.S. PATENT DOCUMENTS

| | | | | |
|---|---|---|---|---|
| 3,837,195 A | * | 9/1974 | Pelto .................. | 70/276 |
| 3,952,563 A | * | 4/1976 | Yamashita ............ | 70/232 |
| 3,978,698 A | * | 9/1976 | Ono ................... | 70/165 |
| 5,279,190 A | * | 1/1994 | Goss et al. ........... | 411/403 |
| 5,302,069 A | * | 4/1994 | Toth et al. ........... | 411/373 |
| 5,479,799 A | * | 1/1996 | Kilman et al. ........ | 70/231 |
| 5,666,831 A | * | 9/1997 | Doros ................. | 70/140 |
| 6,053,078 A | * | 4/2000 | Parker et al. ......... | 81/176.15 |

FOREIGN PATENT DOCUMENTS

| | | | |
|---|---|---|---|
| AR | 003791 B1 | | 11/1999 |
| CA | 0976787 | * | 10/1975 |
| GB | 2220720 A | * | 1/1990 |
| SU | 1201571 A | * | 10/1985 |

* cited by examiner

*Primary Examiner*—Anthony Knight
*Assistant Examiner*—Michael J. Kyle
(74) *Attorney, Agent, or Firm*—Cantor Colburn LLP

(57) ABSTRACT

A safety pin and a magnetic key to actuated, loosen or tighten the pin, which incorporate means to automatically and by magnetic attraction connect a body of a cavity of a head of the pin, formed by a fixed part at an end of a road and by a movable par, by applying the key. The safety head of the pin delimits a totally closed cavity for a body of magnetic material, enable to slide axially while transmitting torque inside the cavity, provided with lateral locking means cooperating with similar means of the body, which is pressed against a bottom of the cavity by a spring supported by an upper base of the movable part, having external torque transmitting locking means for corresponding ones in the key. The latter incorporates in a tubular body a magnet on its extremity, which supports the torque transmitting locking means for coupling with the corresponding one in the head of the pin, while simultaneously applying a magnetic force that attracts the body in the cavity, thus locking the parts of the head in order to apply an actuating torque on the pin.

4 Claims, 5 Drawing Sheets

SAFETY PIN TO BE ACTUATED BY A MAGNETIC KEY

TECHNICAL FIELD

The present invention refers to a safety pin to be actuated by a key and a key to loosen and tighten the referred-to pin, particularly where the key is a magnetic key.

BACKGROUND OF THE INVENTION

Under Patent No. AR003791B1 is disclosed a safety pin composed of a threaded rod ending at its upper end in a safety head, surrounded by a fixed head, integrated into the extremity of the rod and by a movable head, i.e., mounted freely rotating and concentric to the fixed head; both heads, the fixed and the movable ones, are placed coaxially and concentrically at the extremity of the rod with a freely rotating connection of the movable head facing an undue attempt to actuate the pin, or by the use of conventional keys or tools.

The heads, the fixed and the movable ones, limit between themselves a longitudinal cavity in the safety head of the pin concentric to the same, for sheltering an annular body related to the lateral surface of the cavity by mutually cooperating locking means, in order to permit an axially free movement at the same. This annular body has an axial perforation with stepped-up circular and rectangular cross section proportions, respectively, the upper portion forming a seat and partial shelter of the extreme portion of a spring, whose opposite extremity is supported against the internal surface of the basis of the movable head, surrounding a coaxial opening to the geometrical axis of the rod of the pin, the referred-to basis of the movable head presenting blind holes, radially opposed with relation to the opening.

The main request discloses also a special key to actuate, tighten or loosen the pin, constituted by a pair of telescopically mounted bodies, one of which, the upper one, is constituted by a bar presenting a cavity for a spring supported at its bottom and at the bottom of the cavity of the other body mounted with telescopic displacement, a rod being projected from the bottom of the first cavity beyond the free extremity of the lower body, terminating in a rectangular cross section hammered hooking piece, coinciding with the lower rectangular cross section portion of the passing perforation of the input annular body of the pin heads. The lower body of the key has in concentric form the bearing rod of the hammered hooking piece, eyebolts for inserting into the blind holes of the movable head and the upper body of the key at its free extremity, a grip to exercise a tightening or loosening torque of the pin.

As stated in the main request, in order to actuate the pin, the key shall be presented and the hammered hooking piece fixed to its upper body be introduced, and simultaneously the eyebolts of the lower body shall be inserted into the blind holes of the upper basis of the movable head; thus, the upper body or the bar which bears the grip for the referred-to hooking piece shall be inserted into the stepped-up perforation portion of the annular input body of the head, so that the extremity of the rectangular cross section coupling part is positioned below the annular body and can be rotated by 90° in order to be inserted into lower locking and dragging slots of the referred-to annular body.

This permits that the spring confirmed in the key prevails over the load spring of the annular body of the head of the pin, overcoming the same and causing the dislocation of the referred-to body to a locking position of the fixed and movable heads of the pin in order to actuate the same.

As can be appreciated, this pin and key assembly described in the main request complies with its purpose, it is noted that the same needs for its creation a precision mechanism in order to move its components (rod with disengagement means, perforation of different cross sections in the annular locking body in the safety head, springs in this body and the key, with different tensions, etc.); and also the application of the key for actuating the pin requires a series of previous steps to be complied with by the user for performing the torque.

SUMMARY OF THE INVENTION

The invention provides a pin and key assembly incorporating a new means for the reciprocal mechanical and magnetic coupling of the pin and key during its tightening or loosening relation of the referred-to pin and thus, to overcome the friction resistance at the application point.

The invention also provides for the incorporation into pin, of a locking means, by attraction of the magnetic force of the magnet of a key, carrying simultaneous coupling means with the movable head of the pin, in answer to the application of the key on the safety head of the pin.

The invention further provides for safety pins and special actuating keys of the same, a means of coupling the safety head the pin and the mechanical or magnetic combined or loosening.

Still further, the invention provides the incorporation of a locking means for the movable head of the pin in the limiting cavity, constituted by a sliding body of magnetic material, any turning movement being locked in the referred-to cavity but having free axial movement against a spring and in answer to the application of a key bearing a magnet and made of paramagnetic material configured in a tubular cover and capable to ling to the movable head, by means of a coupling end made of magnetic material, capable of coupling with the movable head.

The invention includes a safety pin and a special actuating key of quick and simple application by coupling the torque transmitting means of both the key and the pin, while the magnetic field of the key creates a magnetic attraction force on the sliding locking body of the fixed and movable heads of the pin.

Also, the invention offers a combination of means, in the pin and the key, in order to couple the movable head of the pin to the fixed head operating mechanically and magnetically, in order to permit the application of the torque required to tighten or loosen this type of pin with a rotating movable head, destinated to inhibit the use of conventional keys.

For the purpose of improving the pin and key assembly described in the main request, the present invention proposes improvements of the same, destinated to structurally simplify the pin and the key, offering at the same time an automatic actuation of th latter, based on the effects of the magnetic force of a magnet incorporated into the key, which determines the elimination of previous movements or positioning of the key in order to actuate the pin, and which are indispensable to operate the assembly disclosed in the main request.

According to the invention, the safety pin comprises in the cavity formed by the parts constituting the fixed head and the movable head, a non-rotating sliding body of magnetically attracting material, which has a blind hollow part, whose bottom constitutes the seat of one extremity of its load spring, whose opposed extremity is supported directly against the inner face of the movable head which only at its exposed surface presents the torque transmitting coupling means for interacting with the key.

This latter is in turn constituted by a tubular body of paramagnetic material, which extends on the upper side by means of a portion terminating in a grip support, presenting at the lower extremity of the referred-to tubular body of paramagnetic material a permanent magnet in contact with a closing of material permeable to the magnetic field and bearing a head where the torque transmitting coupling means are arranged corresponding to those in the movable head of the pin.

The application of the key on this latter one determines by magnetic attraction the movement of the sliding locking body of the head of the pin, rotationally locking the fixed parts and movable heads, permitting the application of a torque on the pin, to be tightened or loosened.

BRIEF DESCRIPTION OF THE DRAWINGS

At last.

DETAILED DESCRIPTION OF THE PREFERRED EMBODIMENT

Figure 2:
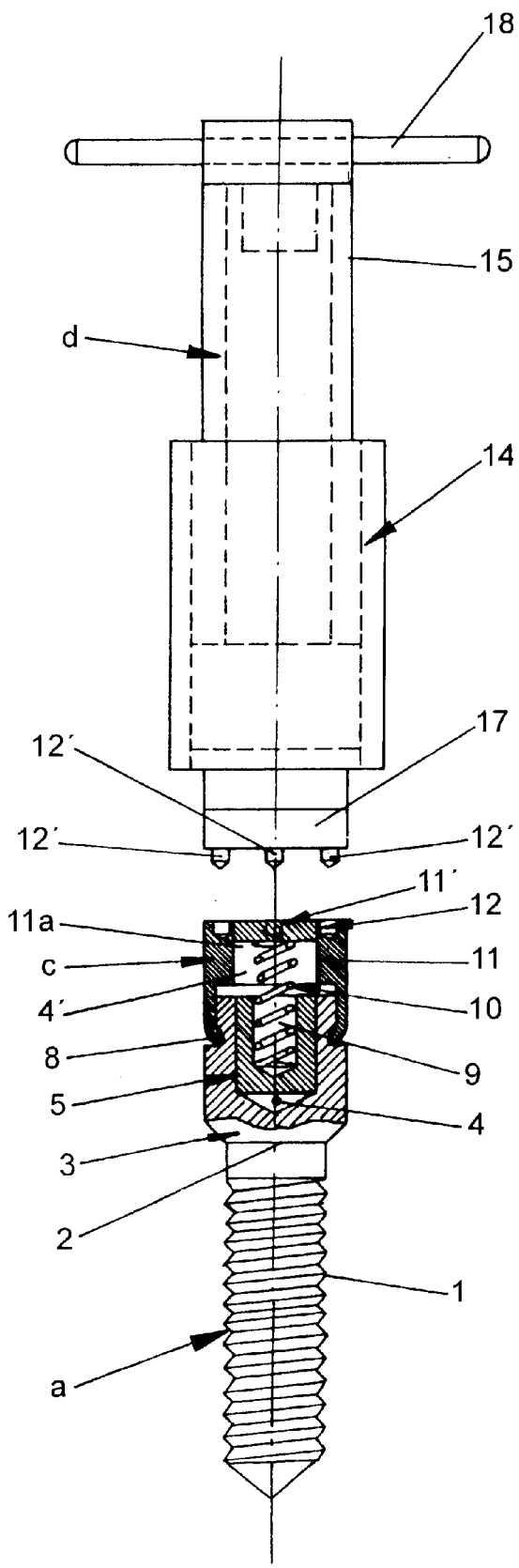
FIG. 2 represents the referred-to pin partially in a cut view, with its movable head confronting the key.
Figure 3:
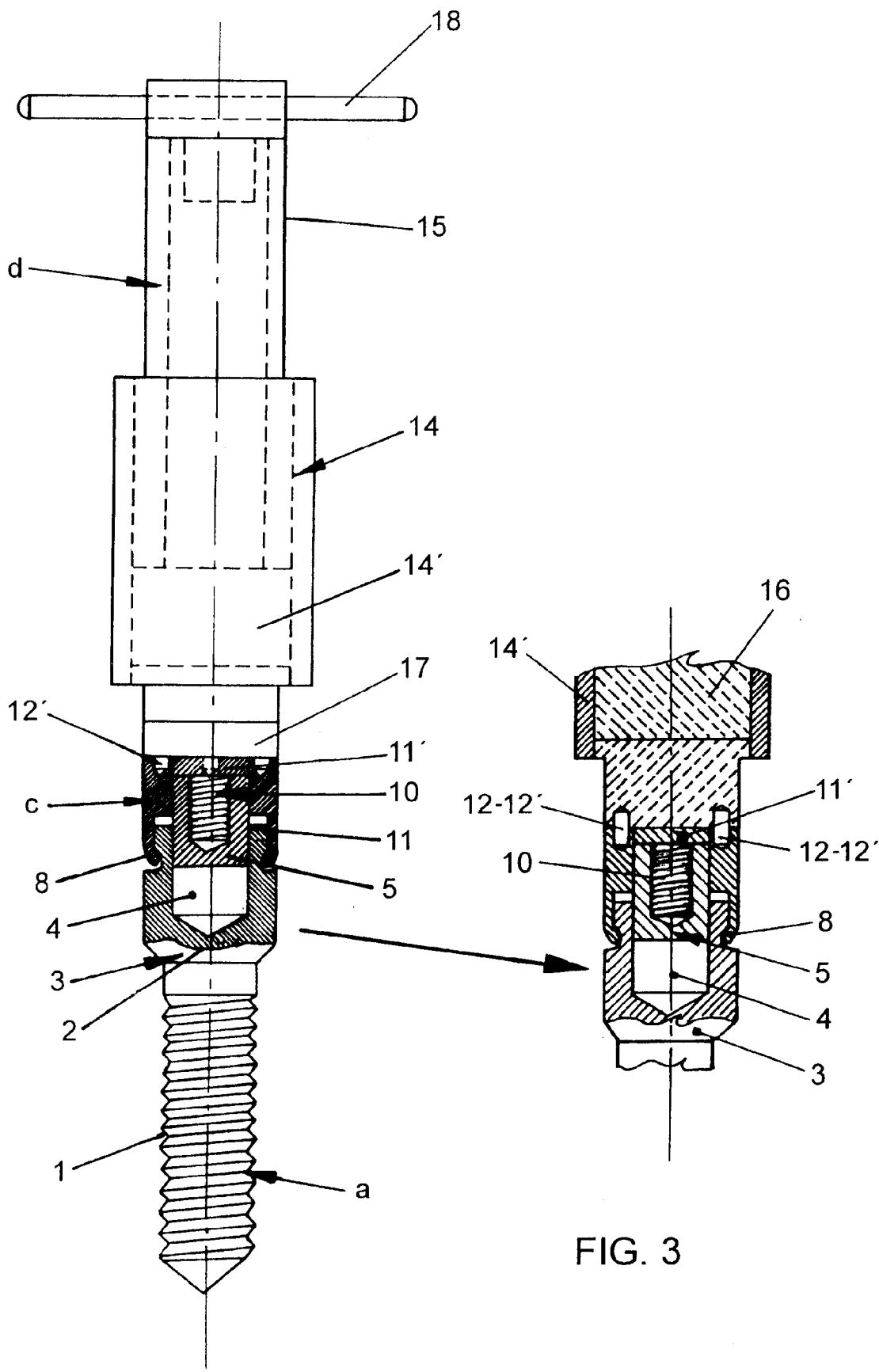
FIG. 3 represents a view similar to the one of (FIG. 2), but with the key in the position connected to the pin, showing the locking of the fixed and movable heads of the latter by magnetic effect; and a detail in larger scale of the locking position of the safety head prior to be submitted to a torque.
Figure 4:
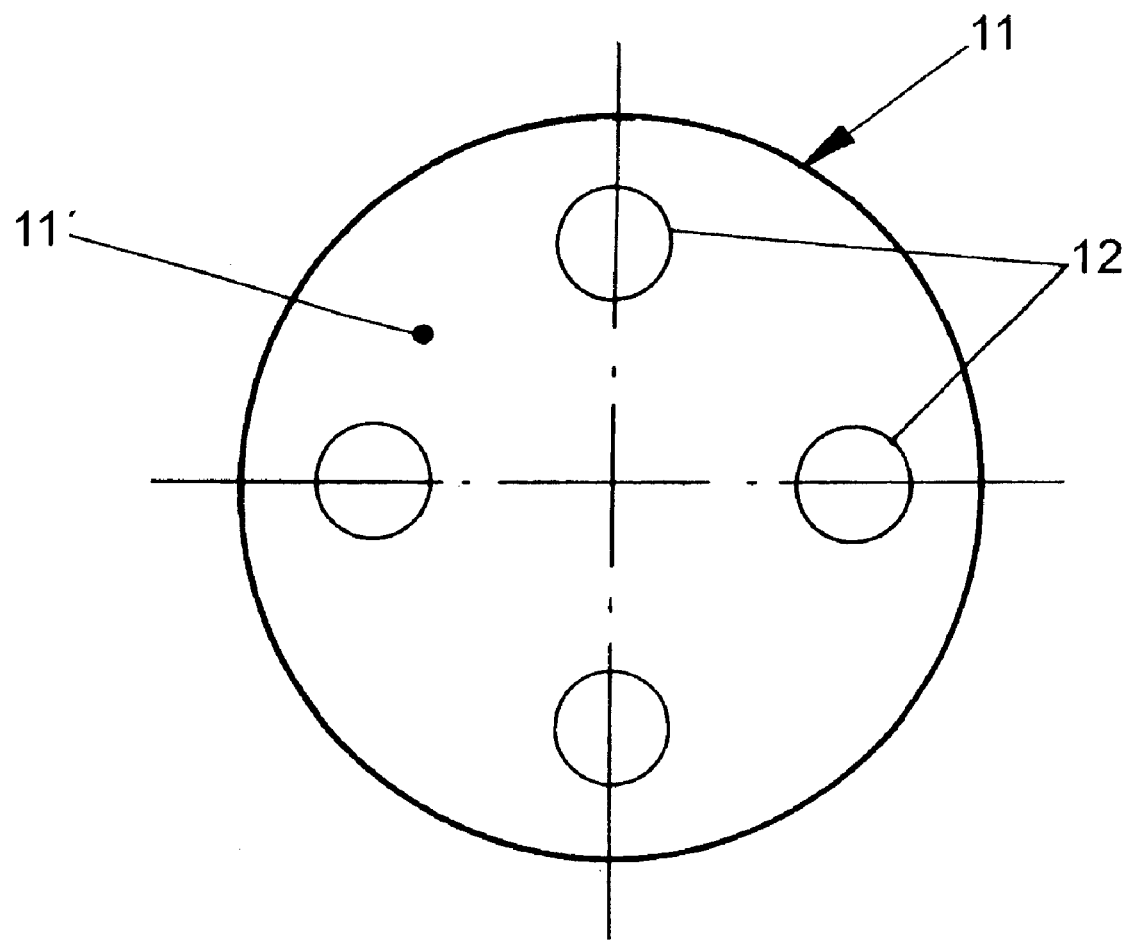
FIG. 4 represents a horizontal projection of the movable head of the pin, which may present variable amounts (3-4-5-6-etc.) of symmetric or asymmetric perforations.

According to the presentation of the drawings, particularly at (FIGS. 1 to 3), where, as presented as an assembly, the pin (a) as in the main request, is comprised by a threaded rod (1) with a safety head (c), totally connected by a conical portion (2) to the rod (1).

The safety head (c) is constituted by a part (3) emerging from the portion (2) and presents a hollow cylindrical part (4); and by a movable part (11) in the form of a bushing, with a complementary hollow part (4') in order to delimitate in the referred-to head (c) an axial cavity (4–4'). The part (3) fixed to the rod (1) and the movable part (11) surround the corresponding fixed and movable heads at the pin, which are related at their connecting extremities by a slot and an eyelash (8), complementary and freely rotating in relation, permitting the rotation of the movable part (11) facing an undue attempt to loosen the pin (a).

The head or movable part (11) has, according to the invention, an upper passage (11'), with only blind orifices (12), or variable symmetrical or asymmetrical amounts, and at its lower face (11'a) it constitutes the support for the extremity of a load spring (10) for the body, which constitutes the locking means for the parts (3) and (11) of the safety head (c).

Figure 1:
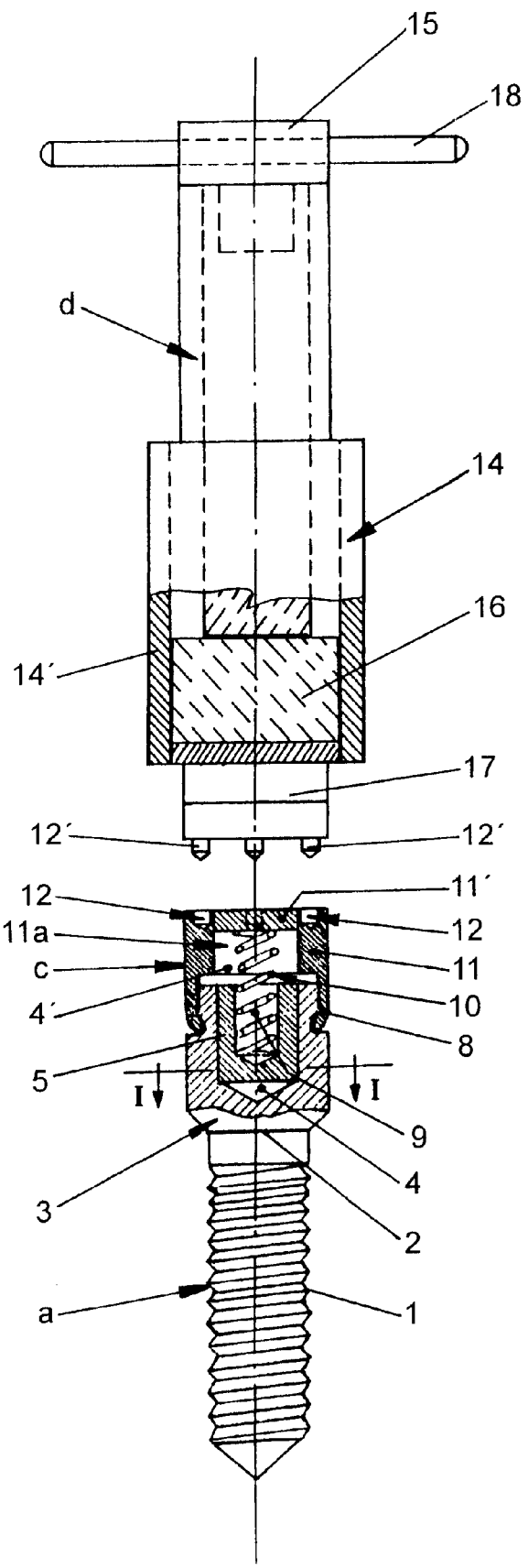
FIG. 1 represents the corresponding elevation views of the pin and key.

This body (5), as represented in (FIG. 5), may be prismatic and of polygonal cross section (square, pentagonal, hexagonal or octagonal), as indicated at the cuts by the line (1—1) of FIG. 1, represented on (FIG. 5) with references A-B-C and D. The facetted lateral surface of the body (5) corresponds to the lateral surface of the cavity (4–4'), i.e. this latter one shall present in a cross section an equal cross section, in order to permit an axial and free movement of the body (5) to its locking position of the parts (3) and (11).

Figure 5:
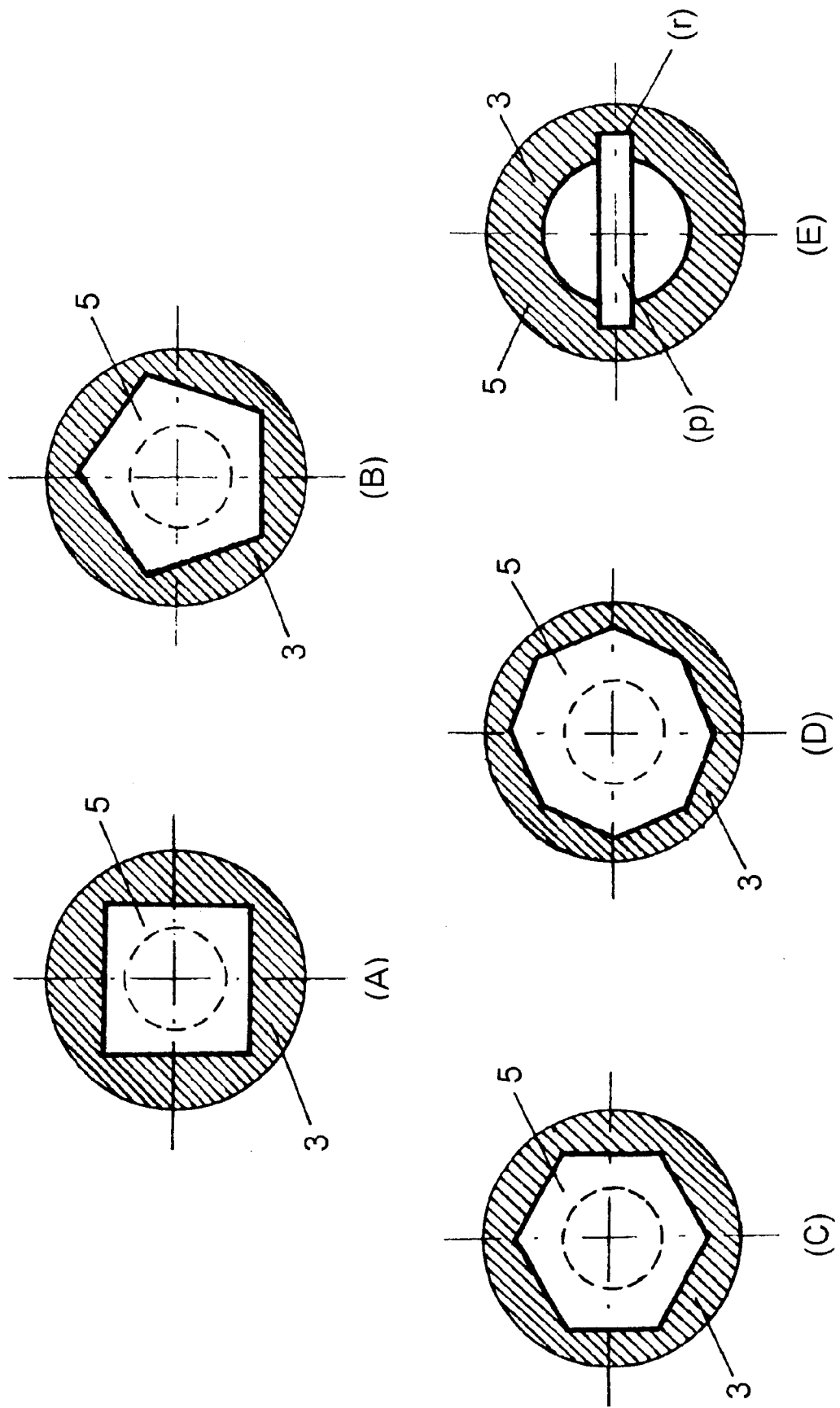
FIG. 5 represents a cut along the line (1—1) of FIG. 1, showing different variants which may be adopted by the lateral surfaces of the cavity of the head of the pin and of the sliding body, in order to avoid rotating effects during their movement.

FIG. 5 in the example B exposes another variant of realizing the body (5), where a cylindrical conformation with a passing device (p), transversal to the body (5) is adopted, which permits to be guided in an axial form in grooves (r) of the cylindrical lateral wall of cavity (4–4').

The body (5), in all realizations, comprises a blind hollow part (9) for supporting the extremity of spring (10), whose opposed extremity is supported at base (11'), also blind, of the movable part (11) of head (c).

The key (d) actuating the pin (a) described, is constituted by a tubular body (14), terminating on the upper side in a head (15), provided with a grip or transversal bar (18), in order to permit the manual actuating of the key (d).

The tubular body (14) according to the invention presents a lower portion (14'), where a permanent magnet (16) is confined and therefore this portion (14') is of insulating material, i.e., paramagnetic material, so that the magnetic field of the magnet (16) can exercise an attraction by means of a support (17) of eyebolts (12'), which, as in the case of the main request, shall be introduced into blind orifices (12) of the base (11') of the movable piece (11) or movable head of the pin (a).

In order to actuate the pin (a), according to the invention, the key (d) is coupled mechanically by insertion of the eyebolts (12') into the blind orifices (12) of the movable piece (11). This permits the simultaneous coupling of the permanent magnet (16) at the base (11') of the referred-to part (11), so that the magnetic material with which the movable part (11) is constituted, and the support (17), due to their magnetizing capacity, exercise an attraction of the locking body (5) of parts (3) and (11) of the safety head (c) in opposite position to the spring (10), obtaining a connection of these parts (3–11) in order to permit exercising a torque on the pin (a) by means of the grip (18). The removal of the key (d) permits the body (5) to return to its inoperant position by action of the spring (10).

As can be appreciated, the actuation of the pin (a) and the structural characteristics of the pin and the key, which are described in the main request, were simplified.

What is claimed is:

1. A safety pin actuated by a key having a safety head comprising:

a fixed part emerging from a conical portion to a threaded rod, said fixed part has a hollow prismatic part;

a movable part having a complementary hollow part and upper wall having a plurality of blind orifices, said movable part is made of a magnetic material; and a body disposed at said hollow prismatic part, said body having an exterior shape that is complementary to the interior shape of said hollow part, said body having a blind hollow part for supporting an extremity of a load spring, said upper wall of said movable part supports an opposite extremity of said load spring, said fixed part and said movable part are related at their connecting extremities by a slot and an eyelash, permitting said movable part to rotate and transmit torque to said threaded rod further comprising a key to loosen or tighten the pin, said key comprising a tubular body having a magnet disposed at a lower portion, said tubular body having eyebolts disposed at one end thereof, said magnet is made of a paramagnetic material so that a magnetic field of said magnet exercises an attraction between said eyebolts and upper wall of said movable part when said eyebolts are disposed in said blind orifices.

2. The safety pin according to claim 1, wherein said body is enabled to slide axially within said hollow prismatic part and said complementary hollow part, said body including a cylindrical conformation having a passing device transverse to said body, said passing device permits said body to be guided in an axial form in grooves of said cylindrical conformation.

3. The safety pin according to claim 1, wherein said prismatic hollow part has a polygonal cross section.

4. The safety pin according to claim 1, wherein said prismatic hollow part has a square cross section.

* * * * *